US011844376B2

(12) United States Patent
Ouyang (10) Patent No.: US 11,844,376 B2
(45) Date of Patent: Dec. 19, 2023

(54) PNEUMATIC SENSOR AND ELECTRONIC CIGARETTE HAVING SAME

(71) Applicant: SHENZHEN IVPS TECHNOLOGY CO., LTD., Shenzhen (CN)

(72) Inventor: Junwei Ouyang, Shenzhen (CN)

(73) Assignee: Shenzhen IVPS Technology Co., Ltd.

( * ) Notice: Subject to any disclaimer, the term of this patent is extended or adjusted under 35 U.S.C. 154(b) by 110 days.

(21) Appl. No.: 16/148,878

(22) Filed: Oct. 1, 2018

(65) Prior Publication Data
US 2020/0011756 A1    Jan. 9, 2020

(30) Foreign Application Priority Data
Jul. 5, 2018    (CN) .......................... 201821063423.8

(51) Int. Cl.
| | | |
|---|---|---|
| *A24F 40/51* | (2020.01) | |
| *G01L 9/00* | (2006.01) | |
| *G01L 19/06* | (2006.01) | |
| *A24F 40/10* | (2020.01) | |

(52) U.S. Cl.
CPC ............ *A24F 40/51* (2020.01); *G01L 9/0051* (2013.01); *G01L 19/0654* (2013.01); *A24F 40/10* (2020.01)

(58) Field of Classification Search
CPC .. G01L 19/0654; G01L 9/0051; A24F 47/008; A61B 5/082
USPC ............................................................ 73/15
See application file for complete search history.

(56) References Cited

U.S. PATENT DOCUMENTS

| | | | | |
|---|---|---|---|---|
| 5,404,891 A | * | 4/1995 | Kiribuchi ................. | A24D 1/10 131/337 |
| 9,022,026 B2 | * | 5/2015 | Fang ...................... | A24F 47/004 128/202.21 |
| 9,788,576 B2 | * | 10/2017 | Liu ...................... | H01M 2/1022 |
| 2006/0196518 A1 | * | 9/2006 | Hon ...................... | H05B 1/0244 131/360 |

(Continued)

FOREIGN PATENT DOCUMENTS

| | | |
|---|---|---|
| CN | 204540828 U | 12/2012 |
| CN | 204556034 U | 12/2015 |

(Continued)

OTHER PUBLICATIONS

Translation CN-109181567-A (Year: 2019).*
Translation CN-214179145-U (Year: 2021).*
Translation CN-209314969-U (Year: 2019).*
Extended European Search Report dated Jul. 3, 2019 in connection with European Application No. 18197832.1.
EP 18197832.1, Jul. 3, 2019, Extended European Search Report.

*Primary Examiner* — Mischita L Henson
*Assistant Examiner* — Monica S Young
(74) *Attorney, Agent, or Firm* — Wolf, Greenfield & Sacks, P.C.

(57) ABSTRACT

The invention discloses a pneumatic sensor and an electronic cigarette having same, wherein the pneumatic sensor comprises a main body, a trigger component and a waterproof and breathable membrane, wherein the main body is provided with an internal cavity and at least one suction hole communicated with the internal cavity, the waterproof and breathable membrane is mounted in the main body and covers each of the suction holes, and the triggering component is mounted in the internal cavity and is triggered when the airflow is sucked from the suction hole to the outside. The technical solution of the invention effectively prevents the phenomenon that tobacco liquid and condensed water penetrate into the sensor, thereby causing damage to the sensor.

22 Claims, 5 Drawing Sheets

(56) References Cited

U.S. PATENT DOCUMENTS

| | | | | |
|---|---|---|---|---|
| 2007/0267031 | A1* | 11/2007 | Hon | A24F 40/42 |
| | | | | 131/273 |
| 2013/0193004 | A1* | 8/2013 | Scheffler | G01N 33/497 |
| | | | | 205/785.5 |
| 2013/0213419 | A1* | 8/2013 | Tucker | H05B 3/141 |
| | | | | 131/328 |
| 2015/0068523 | A1* | 3/2015 | Powers | A61M 15/06 |
| | | | | 128/203.14 |
| 2016/0106152 | A1* | 4/2016 | Liu | G05D 7/0635 |
| | | | | 392/404 |
| 2016/0286858 | A1* | 10/2016 | Liu | H01M 50/107 |
| 2017/0071249 | A1* | 3/2017 | Ampolini | A24F 40/42 |
| 2017/0089795 | A1* | 3/2017 | Perkins | G01L 9/0051 |
| 2017/0266399 | A1* | 9/2017 | Campana | A61H 31/005 |
| 2018/0134545 | A1* | 5/2018 | Morsink | G01L 19/0627 |
| 2018/0360115 | A1* | 12/2018 | Lin | A61M 11/042 |

FOREIGN PATENT DOCUMENTS

| | | | | | |
|---|---|---|---|---|---|
| CN | 105433439 | A | | 3/2016 | |
| CN | 106136321 | A | | 11/2016 | |
| CN | 107890142 | A | | 10/2018 | |
| CN | 108720085 | A | * | 11/2018 | |
| CN | 109181567 | A | * | 1/2019 | C09J 7/29 |
| CN | 209314969 | U | * | 8/2019 | |
| CN | 214179145 | U | * | 9/2021 | A24F 40/51 |
| WO | 2014/114678 | A2 | | 7/2014 | |
| WO | WO-2014144678 | A2 | * | 9/2014 | A24F 40/40 |

* cited by examiner

PNEUMATIC SENSOR AND ELECTRONIC CIGARETTE HAVING SAME

TECHNICAL FIELD

The invention relates to a pneumatic sensor and an electronic cigarette having same.

BACKGROUND

With the gradual development of the electronic cigarette industry, small electronic cigarettes are more and more popular among consumers. In order to reduce the volume of the product, a sensor is usually used to sense the smoke of a user to trigger, so that the electronic cigarette atomizes the stored tobacco liquid into smoke for the user to smoke.

However, the sensor needs to be communicated with the air passage through which the electronic cigarette is suctioned to be triggered when the user smokes. The surface of the electronic cigarette sensor is usually provided with a dust cloth.

SUMMARY

The main object of the invention is to provide a pneumatic sensor, which is intended to prevent the phenomenon that tobacco liquid and condensed water penetrate into the sensor, thereby causing damage to the sensor.

In order to achieve the above object, a pneumatic sensor according to the invention comprises a main body, a trigger component and a waterproof and breathable membrane, wherein the main body is provided with an internal cavity and at least one suction hole communicated with the internal cavity, the waterproof and breathable membrane is mounted in the main body and covers each of the suction holes, and the triggering component is mounted in the internal cavity and is triggered when the airflow is sucked from the suction hole to the outside.

Preferably, the waterproof and breathable membrane comprises an anti-wrinkle ring and a substrate having waterproof and breathable property, wherein the anti-wrinkle ring covers the edge of the substrate so that when the substrate is mounted in the main body, the middle part of the substrate which does not cover the anti-wrinkle ring covers each of the suction holes, and forms a breathable part, and the breathable part is communicated with the suction hole through an air channel.

Preferably, the waterproof and breathable membrane further comprises an adhesive layer, the adhesive layer is provided on the surface of the substrate far away from the anti-wrinkle ring so that the substrate is adhered to the main body, and the adhesive layer is provided to avoid the breathable part of the substrate; and/or, the substrate has a thickness value of 0.02 mm to 0.11 mm.

Preferably, the trigger component comprises a circuit board, a first conductive member, a second conductive member and a trigger diaphragm which are housed in the internal cavity, the first conductive member and the second conductive member are both electrically connected to the circuit board, the trigger diaphragm is electrically connected to the first conductive member; when the airflow is sucked from the suction hole through the waterproof and breathable membrane to the outside, the trigger diaphragm partially vibrates until being in contact with the second conductive member to establish an electrical connection so that the first conductive member is communicated with the second conductive member through a circuit.

Preferably, the trigger component further comprises an annular insulating member, the first conductive member has a hollow tubular shape, both ends of the first conductive member are abutted with the circuit board and the trigger diaphragm, respectively, so that the inside of the first conductive member encircles an air collecting space, the insulating member is provided between the second conductive member and the trigger diaphragm so that the second conductive member is spaced apart from the trigger diaphragm to form a cavity, the hollow portion of the second conductive member corresponding to the insulating member is further provided with at least one air passing hole, and the air passing hole is communicated with the cavity and the suction hole.

Preferably, the circuit board is further provided with at least one air inlet hole, and the air inlet hole is communicated with the air collecting space and the outside.

Preferably, the sum of the venting areas of the air passing holes is greater than the sum of the venting areas of the air inlet holes.

Preferably, the main body comprises a top plate, a bottom plate and a connecting plate connecting the top plate and the bottom plate, the top plate, the bottom plate and the connecting plate encircle the internal cavity, the top plate and the bottom plate clamp opposite surfaces of the second conductive member and the circuit board, the connecting plate is spaced apart from the first conductive member, and the top plate is provided with the suction hole.

Preferably, an insulator is further provided between the connecting plate and the first conductive member.

The invention further provides an electronic cigarette, comprising the pneumatic sensor, wherein the electronic cigarette executes the corresponding command when sensing that the pneumatic sensor is triggered. The pneumatic sensor comprises a main body, a trigger component and a waterproof and breathable membrane, wherein the main body is provided with an internal cavity and at least one suction hole communicated with the internal cavity, the waterproof and breathable membrane is mounted in the main body and covers each of the suction holes, and the triggering component is mounted in the internal cavity and is triggered when the airflow is sucked from the suction hole to the outside.

The pneumatic sensor according to the technical solution of the invention removes the dust cloth covering the suction holes in the conventional air sensor so as to effectively prevent the phenomenon that the tobacco liquid and the condensed water are absorbed by the dust cloth so that it is difficult to clean; and then a waterproof and breathable membrane is provided to cover each of the suction holes so as to effectively prevent the phenomenon that the tobacco liquid and the condensed water are accumulated in the suction hole during long-term use and are penetrated into the pneumatic sensor from the suction hole, thereby causing damage to the trigger component.

BRIEF DESCRIPTION OF THE DRAWINGS

For a better illustration of the embodiments of the invention or the technical solution in the prior art, accompanying drawings needed in the description of the embodiments or the prior art are simply illustrated below. Obviously, the accompanying drawings described below are some embodiments of the invention. For those skilled in the art, other accompanying drawings may be obtained according to the structure shown in these accompanying drawings without creative work.

DESCRIPTION OF THE REFERENCE NUMBERS

| Reference number | Name of part | Reference number | Name of part |
|---|---|---|---|
| 100 | pneumatic sensor | 342 | air collecting space |
| 10 | main body | 35 | insulating member |
| 11 | top plate | 36 | insulator |
| 111 | suction hole | 50 | waterproof and breathable membrane |
| 12 | bottom plate | 51 | substrate |
| 121 | window | 511 | breathable part |
| 13 | connecting plate | 52 | anti-wrinkle ring |
| 131 | through hole | 53 | adhesive layer |
| 30 | trigger component | 200 | controller |
| 31 | circuit board | 210 | main control board |
| 311 | air inlet hole | 300 | atomizer |
| 32 | first conductive member | 310 | atomizing component |
| 321' | air inlet hole | 320 | housing |
| 33 | second conductive member | 330 | airflow passage |
| 331 | air passing hole | 340 | oil storage chamber |
| 34 | trigger diaphragm | 1000 | electronic cigarette |
| 341 | cavity | | |

The implementation of aims, the function features and the advantages of the present disclosure are described below in further detail in conjunction with embodiments with reference to the drawings.

DESCRIPTION OF THE EMBODIMENTS

A clear and complete description as below is provided for the technical solution in the embodiments of the invention in conjunction with the drawings in the embodiments of the invention. Obviously, the embodiments described hereinafter are simply part embodiments of the invention, rather than all the embodiments. All other embodiments obtained by those skilled in the art based on the embodiments in the invention without creative work are intended to be included in the scope of protection of the invention.

It should be noted that all directional indications (such as top, bottom, left, right, front, behind . . . ) in the embodiments of the invention are merely to illustrate a relative position relation, a relative motion condition, etc. between each part in a certain state (for example, the state shown in the drawings). If the state changes, the directional indication changes accordingly.

In addition, if terms "first", "second", etc. appear in the invention, they are merely for the purpose of description, but cannot be understood as the indication or implication of relative importance or as the implicit indication of the number of the designated technical features; therefore, features defined by "first" and "second" may specifically or implicitly comprise at least one such feature. In addition, technical solutions of each embodiment of the invention may be combined mutually; however, this must be carried out on the basis that those skilled in the art can implement the combination. When the combination of technical solutions has a conflict or cannot be implemented, it should be considered that such combination of technical solutions does not exist and is not in the scope of protection claimed by the invention.

In the invention, unless otherwise specifically stated and defined, terms "connected", "fixed", etc. should be interpreted expansively. For example, "fixed" may be fixed connection, detachable connection, or integration; may be mechanical connection or electrical connection; direct connection, indirect connection through an intermediate, or internal communication between two elements or interaction of two elements, unless otherwise specifically defined. Those skilled in the art can understand the specific implication of the above terms in the invention according to specific conditions.

The invention provides a pneumatic sensor 100, which is applied to an electronic cigarette 1000 or other devices triggered by sensing a change in airflow. The invention takes the electronic cigarette 1000 as an example. The electronic cigarette 1000 comprises an atomizer 300 pre-charged with tobacco liquid and a controller 200 for powering the atomizer 300. The pneumatic sensor 100 is mounted in the controller 200; and the atomizer 300 is mounted in the controller 200 and forms an airflow passage 330 with the controller 200. The pneumatic sensor 100 senses a change in airflow within the airflow passage 330 and transmits a signal to the controller 200 to control the atomizer 300 to atomize the pre-stored tobacco liquid so as to generate smoke for user to smoke.

Referring to FIG. 1 to FIG. 5, the pneumatic sensor 100 comprises a main body 10, a trigger component 30 and a waterproof and breathable membrane 50, wherein the main body 10 is provided with an internal cavity and at least one suction hole 111 communicated with the internal cavity, the waterproof and breathable membrane 50 is mounted in the main body 10 and covers each of the suction holes 111, and the triggering component 30 is mounted in the internal cavity and is triggered when the airflow is sucked from the suction hole 111 to the outside.

During the long-term smoking process, the condensed water generated during the atomization process of the stored tobacco liquid will be accumulated in the electronic cigarette cavity, and the surface of the electronic cigarette sensor is usually provided with a dust cloth, which is easy to adsorb tobacco liquid and condensed water, resulting in a reduced sensitivity and even a phenomenon of short-circuit damage. The pneumatic sensor 100 according to the technical solution of the invention removes the dust cloth covering the suction holes 111 in the conventional air sensor 100 so as to effectively prevent the phenomenon that the tobacco liquid and the condensed water are absorbed by the dust cloth so that it is difficult to clean; and then a waterproof and breathable membrane is provided 50 to cover each of the suction holes 111. The waterproof and breathable membrane 50 can be used for normal circulation of airflow, without affecting the original working performance of the pneumatic sensor 100. At the same time, it is effective to prevent the phenomenon that the tobacco liquid and the condensed water are accumulated in the suction hole 111 during long-term use and are penetrated into the pneumatic sensor 100 from the suction hole 111, thereby causing damage to the trigger component 30.

Figure 2:
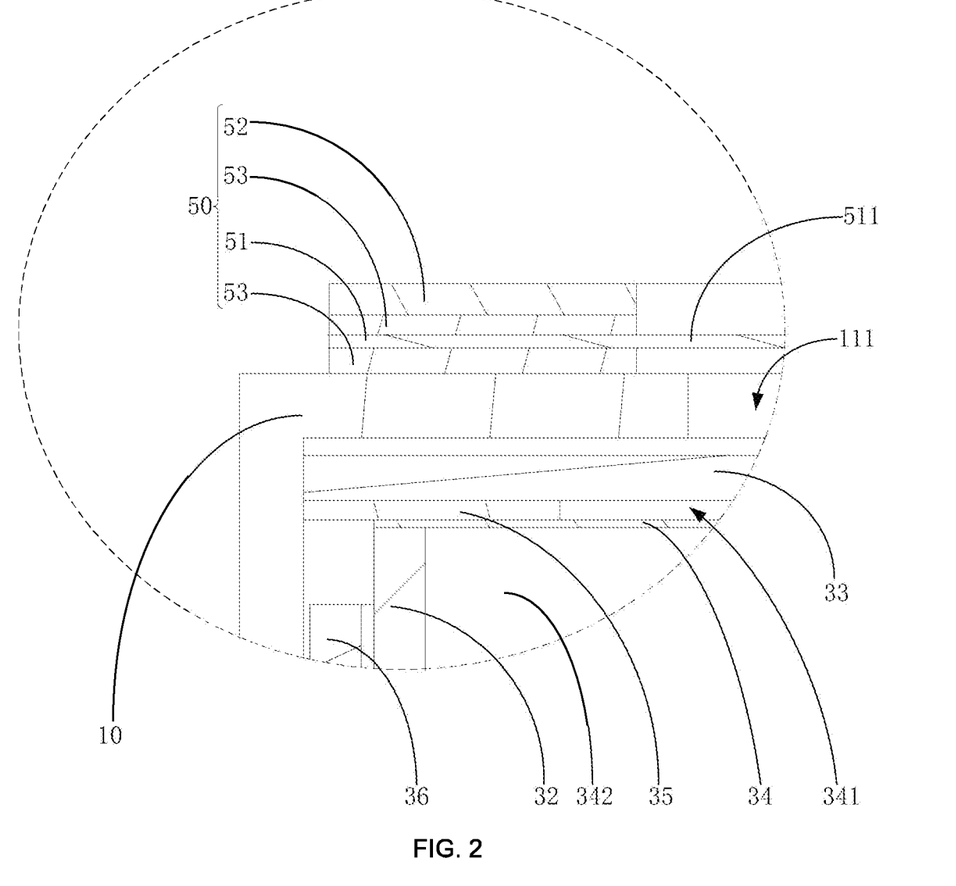
FIG. 2 is a partial enlarged schematic diagram illustrating part A shown in FIG. 1 according to the invention.

Further, as shown in FIG. 2, in the embodiment of the invention, the waterproof and breathable membrane 50 comprises an anti-wrinkle ring 52 and a substrate 51 having waterproof and breathable property, wherein the anti-wrinkle ring 52 covers the edge of the substrate 51 so that when the substrate 51 is mounted in the main body 10, the middle part of the substrate 51 which does not cover the anti-wrinkle ring 52 covers each of the suction holes 111, and forms a breathable part 511, and the breathable part 511 is communicated with the suction hole 111 through an air channel. Here, in the present embodiment, the substrate 51 is formed by hot-melting a high-performance composite material, such as a TPU waterproof and breathable membrane 50, an EPTFE composite fabric, etc. The better waterproof and breathable property enables water vapor to pass freely, and at the same time, the condensed water dew is prevented from being penetrated into the main body 10 along the suction hole 111, thereby causing damage to the trigger component 30; at the same time, in order to ensure better breathable property, the thickness of the substrate 51 is preferably in the range of 0.02 mm to 0.11 mm, and is more preferably 0.06 mm in the present embodiment. Further, in order to prevent the substrate 51 from deforming and wrinkling during the movement of airflow, in the present embodiment, a hard anti-wrinkle ring 52 is covered on the edge of the substrate 51. The anti-wrinkle ring 52 may be selected from polymeric materials such as polyethylene terephthalate, polyethylene plastics, polypropylene plastics, fluoroplastics, polyvinyl chloride, and polyperfluoroethylene propylene. In the present embodiment, the anti-wrinkle ring 52 is prepared using polyethylene terephthalate, and is fixed to the substrate 51 by gluing, so that the substrate 51 has a certain tension to avoid wrinkles. At the same time, the substrate 51 not covered by the anti-wrinkle ring 52 forms a breathable part 511 through which the air in the suction hole 111 flows out.

Further, as shown in FIG. 2, in the embodiment of the invention, the waterproof and breathable membrane 50 further comprises an adhesive layer 53, the adhesive layer 53 is provided on the surface of the substrate 51 far away from the anti-wrinkle ring 52 so that the substrate 51 is adhered to the main body 10, and the adhesive layer 53 is provided to avoid the breathable part 511 of the substrate 51. Here, in the present embodiment, the adhesive layer 53 is provided on the surface of the substrate 51 far away from the anti-wrinkle ring 52. When the substrate 51 is adhered to the main body 10, the hard wrinkle ring 52 protrudes from the outside, effectively preventing the phenomenon of abrasion and breakage of the substrate 51.

It is to be understood that in practical applications, the adhesive layer 53 is not limited to being provided on the surface of the substrate 51 far away from the anti-wrinkle ring 52 as described above. For example, the manner in which the adhesive layer 53 may be also provided on the outer surface of the main body 10 or provided on the surface of the anti-wrinkle ring 52 far away from the substrate 51 so as to fix the substrate 51 to the main body 10 falls within the scope of protection of the invention.

Figure 3:
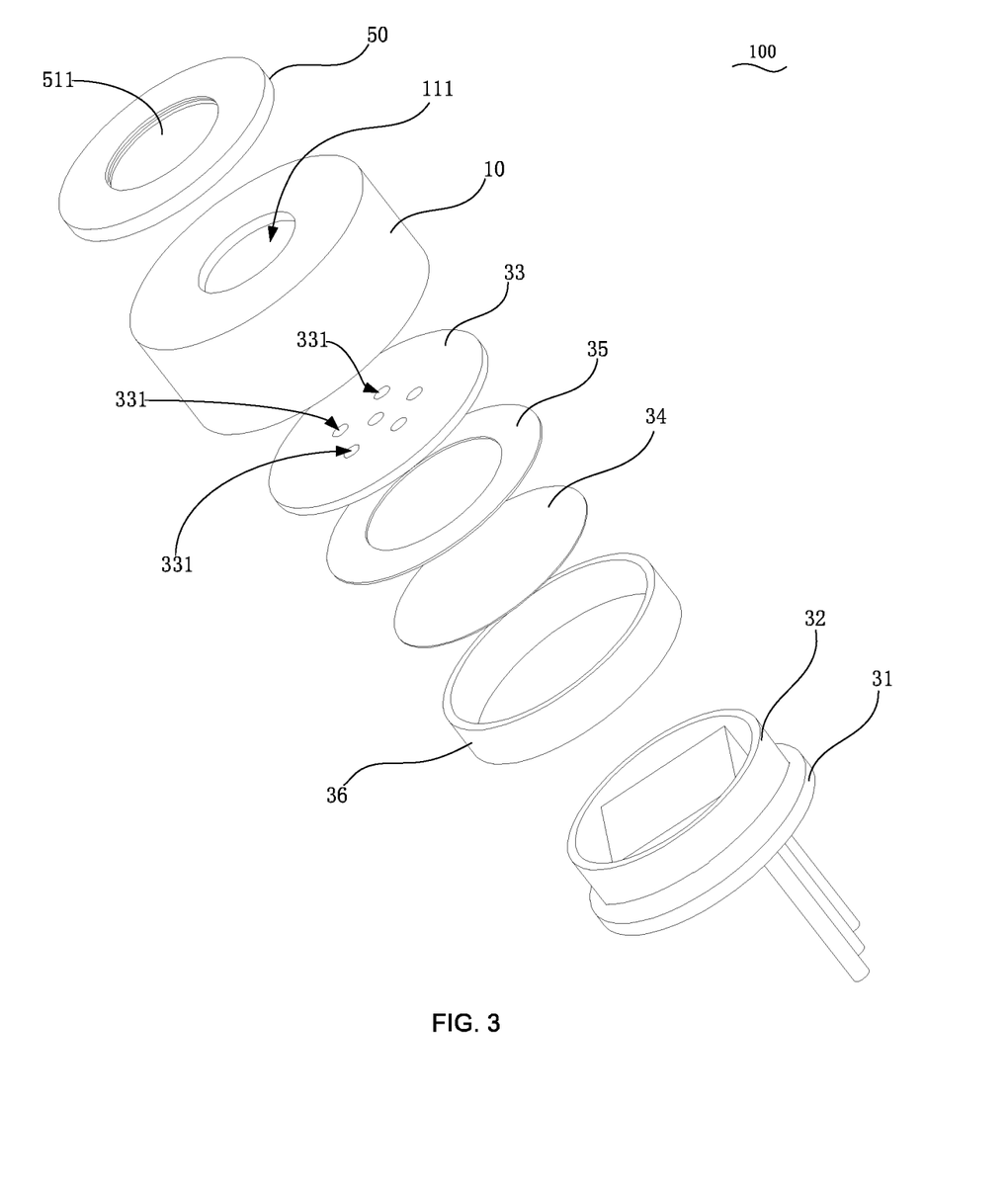
FIG. 3 is an exploded schematic diagram illustrating a connecting structure of a pneumatic sensor according to the invention.

Specifically, as shown in FIG. 3, in the embodiment of the invention, the trigger component 30 comprises a circuit board 31, a first conductive member 32, a second conductive member 33 and a trigger diaphragm 34 which are housed in the internal cavity, the first conductive member 32 and the second conductive member 33 are both electrically connected to the circuit board 31, the trigger diaphragm 34 is electrically connected to the first conductive member 32; when the airflow is sucked from the suction hole 111 through the waterproof and breathable membrane 50 to the outside, the trigger diaphragm 34 partially vibrates until being in contact with the second conductive member 33 to establish an electrical connection so that the first conductive member 32 is communicated with the second conductive member 33 through a circuit. Here, in the present embodiment, the first conductive member 32 and the second conductive member 33 are both stably and electrically connected to the circuit board 31. The trigger diaphragm 34 is provided between the first conductive member 32 and the second conductive members 33 and is electrically connected to the first conductive member 32. When the user smokes, and when the airflow inside the main body 10 is drawn out from the suction hole 111, an air pressure difference is formed between the inside and the outside of the main body 10, thereby driving the trigger diaphragm 34 to vibrate. When the trigger diaphragm 34 vibrates until being in contact with the second conductive member 33, the second conductive member 33 and the first conductive member 32 are electrically communicated. Both the first conductive member 32 and the second conductive member 33 are electrically communicated with the circuit board 31 after the first conductive member 32 and the second conductive member 33 are connected in parallel. At this time, the total resistance value of the circuit board 31 connected to the load is changed, thereby triggering the circuit board 31 to transmit a corresponding control command to the controller 200 of the electronic cigarette 1000. When the user stops smoking, the air pressure difference is restored, the trigger diaphragm 34 is separated from the second conductive member 33, the total resistance value of the circuit board 31 connected to the load is restored to the original value, and the circuit board 31 stops transmitting the control command to the controller 200 of the electronic cigarette 1000.

Further, as shown in FIG. 2 or FIG. 3, in the embodiment of the invention, the trigger component 30 further comprises an annular insulating member 35, the first conductive member 32 has a hollow tubular shape, both ends of the first conductive member 32 are abutted with the circuit board 31 and the trigger diaphragm 34, respectively, so that the inside of the first conductive member 32 encircles an air collecting space 342, the insulating member 35 is provided between the second conductive member 33 and the trigger diaphragm 34 so that the second conductive member 33 is spaced apart from the trigger diaphragm 34 to form an internal cavity 341, the hollow portion of the second conductive member 33 corresponding to the insulating member 35 is further provided with at least one air passing hole 331, and the air passing hole 331 is communicated with the cavity 341 and the suction hole 111. Here, in the present embodiment, the first conductive member 32 has a hollow tubular shape. The end of the first conductive member 32 is fit with the circuit board 31 to block the inner space of the tubular body, and is electrically connected to the circuit board 31. The trigger diaphragm 34 covers the end of the first conductive member 32 far away from the circuit board 31, so that the inner space of the first conductive member 32 encircles a closed air collecting space 342. The second conductive member 33 has a plate shape to tightly press the insulating member 35 against the surface of the trigger diaphragm 34 far away from the first conductive member 32 to prevent the phenomenon that the trigger diaphragm 34 shakes and falls off. At the same time, the inner diameter of the annular insulating member 35 is hollow so that there is a gap between the second conductive member 33 and the trigger diaphragm 34 to form the cavity 341. The second conductive member 33 is provided with a plurality of air passing holes 331. The plurality of air passing holes 331 and the suction holes 111 are electrically connected through an air channel, and the sum of the venting areas of the plurality of air passing holes 331 is smaller than the sum of the venting areas of the suction holes 111. When the user smokes, the airflow in the internal cavity is extracted from the plurality of air passing holes 331. Moreover, since the air in the air collecting space 342 cannot be discharged due to being blocked by the trigger diaphragm 34, the air pressure difference is generated to push the trigger diaphragm 34 to move toward the air passing holes 331 so as to establish an electrical connection when moved until being in contact with the second conductive member 33. When the user stops smoking, the outside airflow enters the internal cavity through the air passing holes 331, thereby eliminating the air pressure difference.

Figure 1:
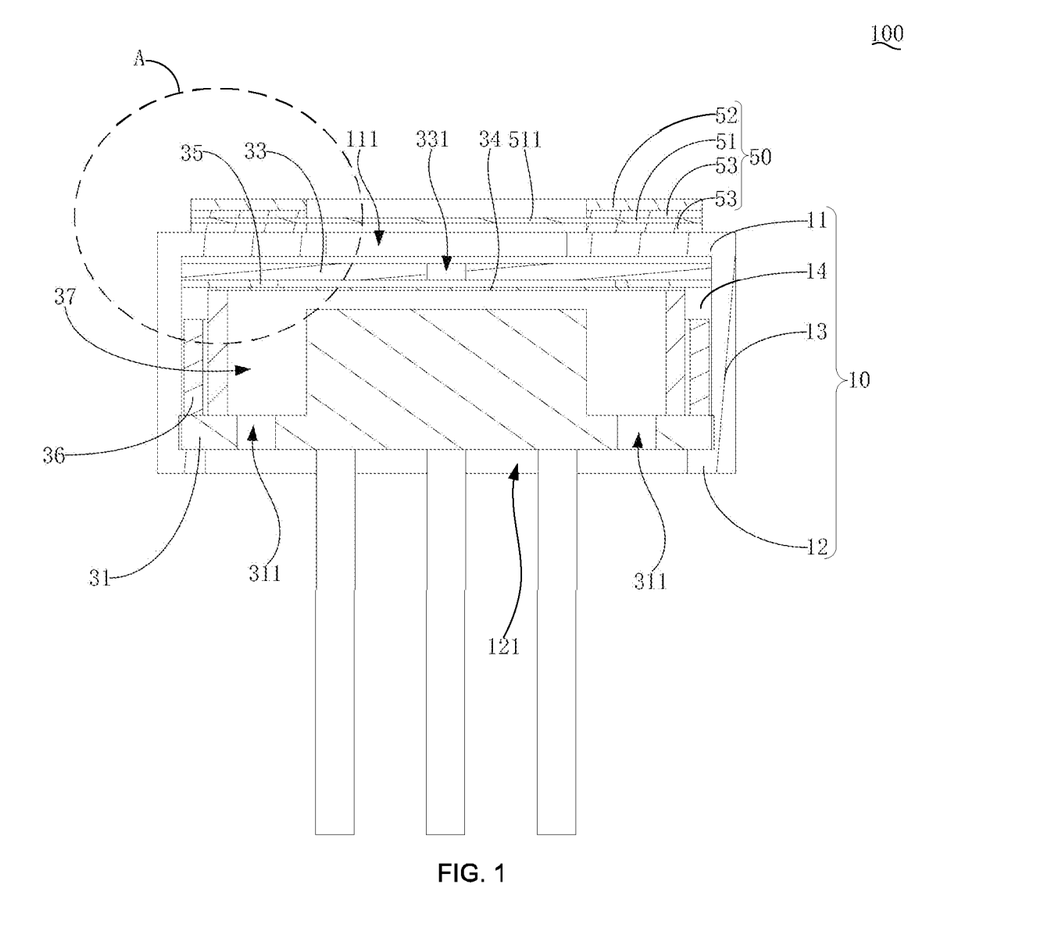
FIG. 1 is a schematic diagram illustrating a connecting structure of a pneumatic sensor according to the invention.

Further, as shown in FIG. 1, in the embodiment of the invention, the circuit board 31 is further provided with at least one air inlet hole 311, and the air inlet hole 311 is communicated with the air collecting space 342 and the outside. Here, in the present embodiment, the circuit board 31 is provided with two air inlet holes 311. When the user smokes, the outside airflow may enter the air collecting space 342 from the two air inlet holes 311, and the volume of the air collecting space 342 changed due to the deformation of the trigger diaphragm 34 is supplemented, so that it is easier to push the trigger diaphragm 34 to move toward the second conductive member 33.

Figure 4:
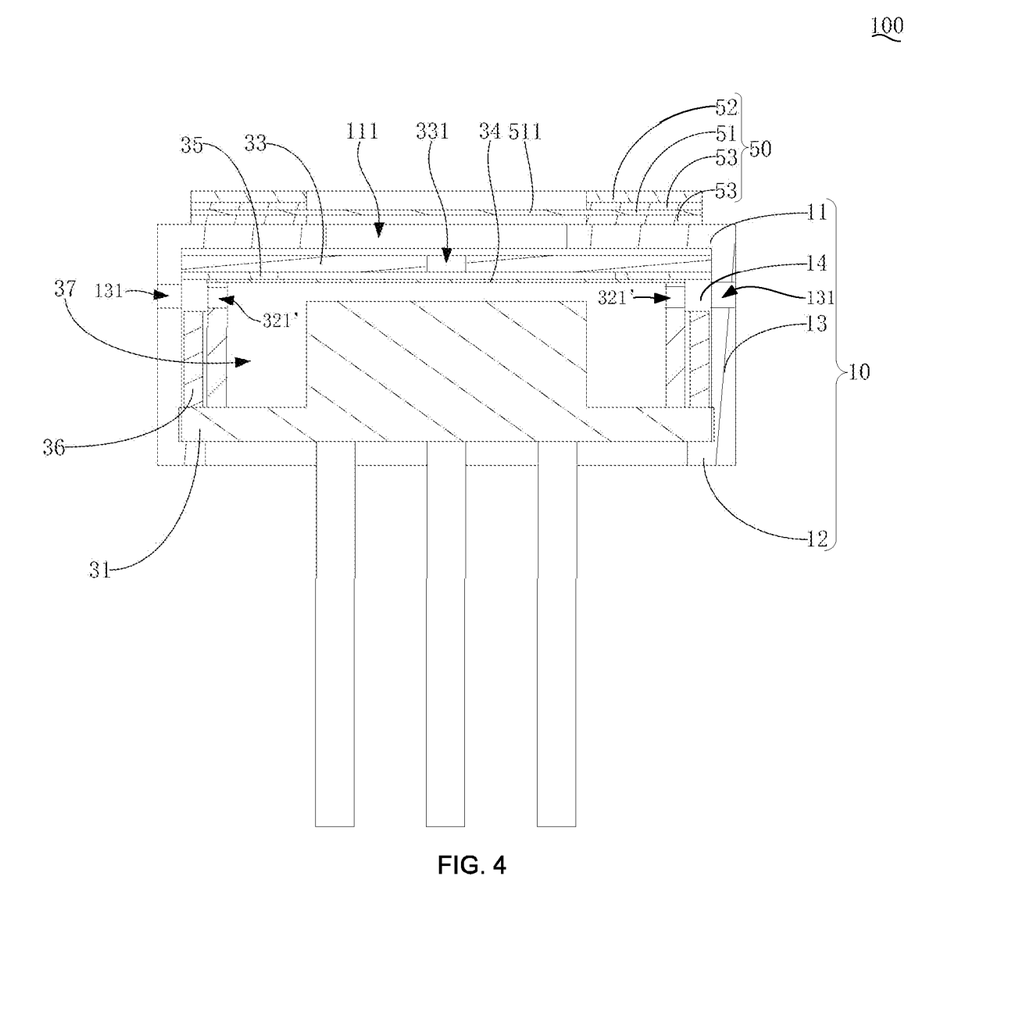
FIG. 4 is a cross-sectional schematic diagram illustrating a connecting structure of a pneumatic sensor according to another embodiment of the invention.

It is to be understood that, in practical applications, the air inlet hole 311 is not limited to being formed in the circuit board 31 as described above. For example, as shown in FIG. 4, in another embodiment of the invention, the manner in which the air inlet hole 311' may be also provided with a through hole 131 formed by the first conductive member 32 and a plurality of air inlet holes 311' are formed through the main body 10 to be communicated with the through hole 131 to achieve air supply in the air collecting space 342 falls also within the scope of protection of the invention.

Specifically, the sum of the venting areas of the air passing holes 331 is greater than the sum of the venting areas of the air inlet holes 311. Here, in the present embodiment, the total venting area of the plurality of air passing holes 331 is greater than the total venting area of the plurality of air inlet holes 311, so that the total amount of air flowing out of the internal cavity per unit time is greater than the total amount of air entering the air collecting space 342 from the air inlet, ensuring the formation of the air pressure difference.

Specifically, as shown in FIG. 1, in the embodiment of the invention, the main body 10 comprises a top plate 11, a bottom plate 12 and a connecting plate 13 connecting the top plate 11 and the bottom plate 12, the top plate 11, the bottom plate 12 and the connecting plate 13 encircle the internal cavity, the top plate 11 and the bottom plate 12 clamp opposite surfaces of the second conductive member 33 and the circuit board 31, the connecting plate 13 is spaced apart from the first conductive member 32, and the top plate 11 is provided with the suction hole 111. Here, in the present embodiment, the main body 10 is made of a conductive material. The top plate 11 clamps the second conductive member 33 and establishes an electrical connection with the second conductive member 33, and then is electrically connected to the circuit board 31 through the connecting plate 13 and the bottom plate 12. At the same time, the bottom plate 12 is provided with a window 121 to expose a part of the surface of the circuit board 31 for the air inlet hole 311 to be communicated with the outside.

Further, as shown in FIG. 1, in the embodiment of the invention, an insulator 36 is further provided between the connecting plate 13 and the first conductive member 32. Here, in the present embodiment, the outer diameter value of the plate-shaped second conductive member 33 is larger than the outer diameter value of the end of the tubular-shaped first conductive member 32, so that a gap is formed between the connecting plate 13 and the first conductive member 32 to prevent the phenomenon that the direct contact between the connecting plate 13 and the first conductive member 32 enables the second conductive member 33 and the first conductive member 32 to be electrically communicated. At the same time, an insulator 36 is provided in the gap there between to further prevent the first conductive member 32 from shaking into direct contact with the connecting plate 13 during long-term use, so that the first conductive member 32 and the second conductive member 33 are electrically communicated, resulting in the phenomenon of false triggering.

Figure 5:
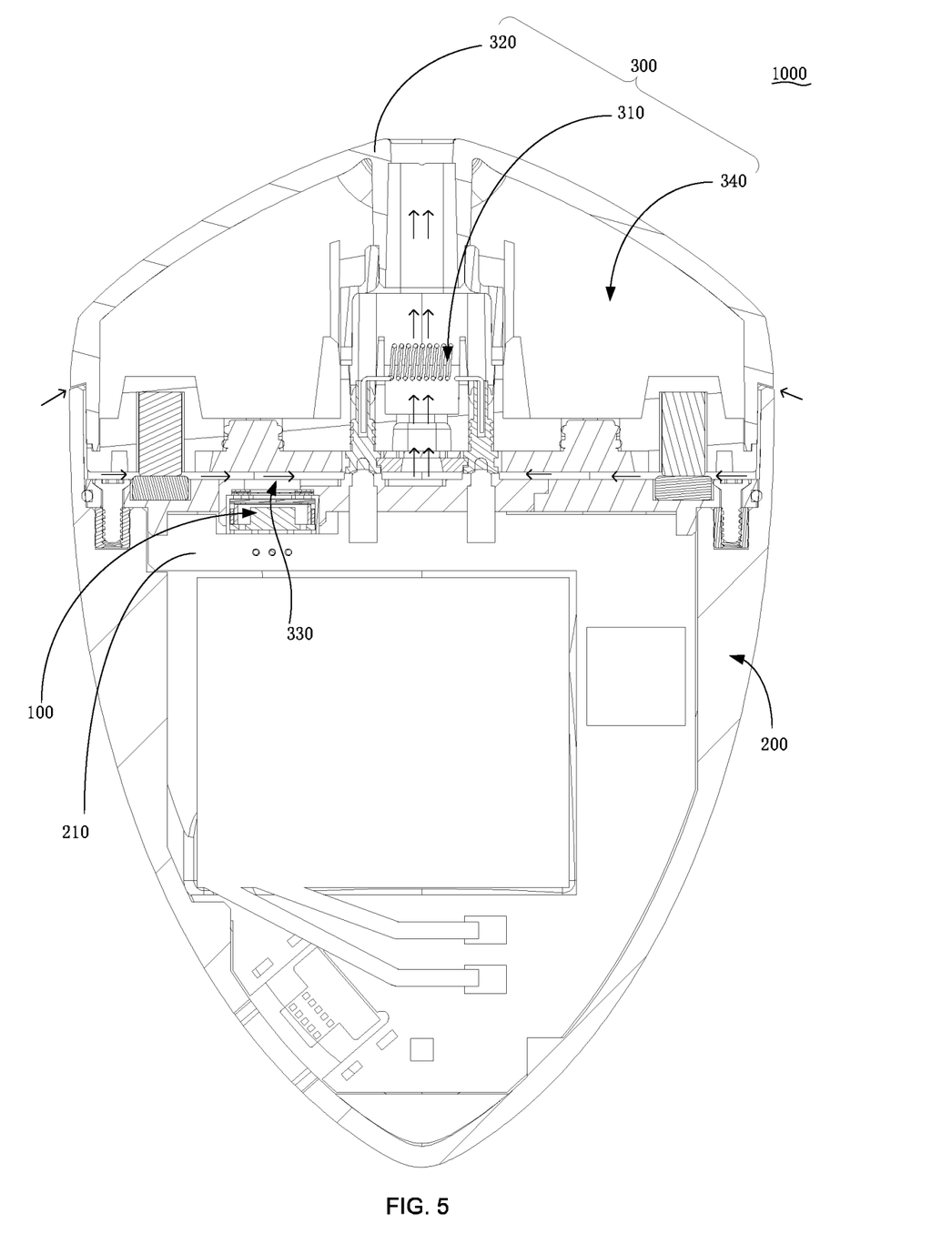
FIG. 5 is a cross-sectional schematic diagram illustrating a connecting structure of an electronic cigarette according to the invention.

Referring to FIG. 5, the invention further provides an electronic cigarette 1000. The electronic cigarette 1000 comprises a pneumatic sensor 100. The electronic cigarette 1000 executes the corresponding command when sensing that the pneumatic sensor 100 is triggered. Refer to the above embodiment for the specific structure of the pneumatic sensor 100. Due to the use of all the technical solutions of all the above embodiments, the electronic cigarette 1000 has at least all the beneficial effects brought by the technical solutions of the above embodiments, which will not be described in detail herein.

As shown in FIG. 5, in the embodiment of the invention, the electronic cigarette 1000 comprises an atomizer 300 and a controller 200. The controller 200 is provided with a main control board 210 and a receiving chamber with an opening. The atomizer 300 comprises an atomizing component 310 and a housing 320 covering the atomizing component 310. One end of the housing 320 is inserted in the receiving chamber and an airflow passage 330 is formed between the end of the housing 320 and the internal cavity wall of the receiving chamber. The atomizing component 310 is electrically connected to the main control board 210 when the housing 320 is inserted into the receiving cavity, and forms an oil storage chamber 340 with the housing 320. The air inlet end of the atomizer 300 is communicated with the airflow passage 330, and the air outlet end thereof is communicated with the outside through the housing 320. The airflow passage 330 is mounted with the pneumatic sensor 100 as described above. The pneumatic sensor 100 triggers to transmit a control signal to the main control board 210 when the airflow in the airflow passage 330 is extracted at a high speed, driving the main control board 210 to supply power to the atomizing component 310 so that the atomizing component 310 heats the internally stored tobacco liquid to generate smoke for the user to smoke.

The above are preferred embodiments of the invention merely and are not intended to limit the patent scope of the invention. Any equivalent structures made according to the description and the accompanying drawings of the invention without departing from the idea of the invention, or any equivalent structures applied in other relevant technical fields directly or indirectly are intended to be included in the patent protection scope of the invention.

What is claimed is:

1. A vaping device comprising:
   an atomizer;
   an airflow passage between an air inlet and an air outlet, and configured to carry an atomized liquid from the atomizer to the air outlet; and
   a pneumatic sensor, the pneumatic sensor comprising:
      a main body having an internal cavity and a suction hole in communication with the internal cavity,
      a trigger component mounted in the internal cavity and configured to activate the atomizer when triggered;
      a waterproof and breathable membrane mounted to the main body and covering the suction hole, the waterproof and breathable membrane comprising a ring and a substrate having waterproof and breathable property, the ring is configured to cover an edge of the substrate such that a middle part of the substrate not covered by the ring covers the suction hole;
      an air collecting space; and
      a plurality of air inlet holes communicated with the air collecting space and the outside,
      wherein the waterproof and breathable membrane is disposed between the airflow passage and the suction hole, and
      the trigger component is configured to be triggered when air is drawn from the plurality of air inlet holes through the air collecting space and air is drawn out from the suction hole to an air outlet through the waterproof and breathable membrane.

2. The vaping device according to claim 1, wherein the waterproof and breathable membrane further comprises an adhesive layer, the adhesive layer is provided on a surface of the substrate so that the substrate is adhered to the main body, and the adhesive layer is provided to avoid the middle part of the substrate.

3. The vaping device according to claim 1, wherein the trigger component comprises
   a circuit board,
   a first conductive member,
   a second conductive member and
   a trigger diaphragm which are housed in the internal cavity, the first conductive member and the second conductive member are both electrically connected to the circuit board, the trigger diaphragm is electrically connected to the first conductive member; when the airflow is sucked from the suction hole through the waterproof and breathable membrane to the outside, the trigger diaphragm partially vibrates until being in contact with the second conductive member to establish an electrical connection, so that the first conductive member is communicated with the second conductive member through a circuit.

4. The vaping device according to claim 3, wherein the trigger component further comprises an annular insulating member, the first conductive member has a hollow tubular shape, both ends of the first conductive member abut against the circuit board and the trigger diaphragm, respectively, so that the inside of the first conductive member encircles the air collecting space, the insulating member is provided between the second conductive member and the trigger diaphragm so that the second conductive member is spaced apart from the trigger diaphragm, a hollow portion of the second conductive member corresponding to the insulating member is further provided with at least one air passing hole, and the air passing hole is communicated with the cavity and the suction hole.

5. The vaping device according to claim 4, wherein the plurality of air inlet holes are disposed in the circuit board.

6. The vaping device according to claim 5, wherein a sum of venting areas of the air passing holes is greater than a sum of venting areas of the air inlet holes.

7. The vaping device according to claim 4, wherein the main body comprises a top plate, a bottom plate and a connecting plate connecting the top plate and the bottom plate, the top plate, the bottom plate and the connecting plate encircle the internal cavity, the top plate and the bottom plate clamp opposite surfaces of the second conductive member and the circuit board, the connecting plate is spaced apart from the first conductive member, and the top plate is provided with the suction hole.

8. The vaping device according to claim 7, wherein an insulator is further provided between the connecting plate and the first conductive member.

9. The vaping device of claim 1, wherein:
   the atomizer is configured to atomize stored tobacco liquid.

10. The vaping device according to claim 1, wherein the trigger component comprises a trigger diaphragm and a conductive member having at least one air passing hole, the conductive member disposed between the trigger diaphragm and the suction hole.

11. The vaping device according to claim 1, further comprising:
   a control board configured to supply power to the atomizer based on a signal received from the pneumatic sensor, wherein the control board is disposed in a first plane that is perpendicular to the waterproof and breathable membrane.

12. The vaping device according to claim 1, wherein:
   the trigger component is not penetrated by the air flow passage.

13. An electronic cigarette, comprising:
   an atomizer; and
   a pneumatic sensor that comprises:
      a main body having an internal cavity and a suction hole;
      a trigger component mounted in the internal cavity and configured to activate the atomizer when triggered;
      an air collecting space;
      a plurality of air inlet holes communicated with the air collecting space and the outside; and
      a waterproof and breathable membrane mounted in the main body and covering the suction hole, the waterproof and breathable membrane comprising:
         a substrate having waterproof and breathable property and a thickness value in a range from 0.02 mm to 0.11 mm; and
         a ring covering an edge of the substrate so that when the substrate is mounted in the main body, a middle part of the substrate which is not covered by the ring covers the suction hole, and forms a breathable part in communication with the suction hole through an air channel, wherein
   the trigger component is configured to be triggered when air is drawn from the plurality of air inlet holes through the air collecting space and air is drawn out from the suction hole to an air outlet through the waterproof and breathable membrane.

14. The electronic cigarette of claim 13, wherein the thickness value of the substrate is in a range from 0.02 mm to 0.06 mm.

15. The electronic cigarette of claim 13, wherein
the ring comprises a polymeric material that is polyethylene terephthalate, polyethylene plastics, polypropylene plastics, fluoroplastics, polyvinyl chloride, or polyperfluoroethylene propylene.

16. The electronic cigarette of claim 13, wherein
the substrate comprises TPU or EPTFE composite.

17. The electronic cigarette of claim 13, wherein
The electronic cigarette is configured to execute a command upon an indication from the trigger component that airflow is sucked outside of the internal cavity via the suction hole.

18. The electronic cigarette of claim 17, wherein
the trigger component comprises a circuit board, a first conductive member, a second conductive member and a trigger diaphragm which are housed in the internal cavity, the first conductive member and the second conductive member are both electrically connected to the circuit board, the trigger diaphragm is electrically connected to the first conductive member; when the airflow is sucked from the suction hole through the waterproof and breathable membrane to the outside, the trigger diaphragm is configured to partially vibrate until being in contact with the second conductive member to establish an electrical connection.

19. An electronic cigarette, comprising:
an atomizer; and
a pneumatic sensor that comprises:
  a main body having an internal cavity and a suction hole;
  a trigger component mounted in the internal cavity and configured to activate the atomizer when triggered;
  an air collecting space;
  a plurality of air inlet holes communicated with the air collecting space and the outside; and
  a waterproof and breathable membrane mounted in the main body and covers the suction hole, the waterproof and breathable membrane comprising:
    a substrate having waterproof and breathable property; and
    a ring covering an edge of the substrate, wherein a portion of the substrate not covered by the ring covers the suction hole, and wherein the ring comprises a polymeric material that is polyethylene terephthalate, polyethylene plastics, polypropylene plastics, fluoroplastics, polyvinyl chloride, or polyperfluoroethylene propylene, wherein
  the trigger component is configured to be triggered when air is drawn from the plurality of air inlet holes through the air collecting space and air is drawn out from the suction hole to an air outlet through the waterproof and breathable membrane.

20. The electronic cigarette of claim 19, wherein the substrate has a thickness value in a range from 0.02 mm to 0.11 mm.

21. The electronic cigarette of claim 19, wherein
the substrate comprises TPU or EPTFE composite.

22. The electronic cigarette of claim 17, wherein
the trigger component comprises a circuit board, a first conductive member, a second conductive member and a trigger diaphragm which are housed in the internal cavity, the first conductive member and the second conductive member are both electrically connected to the circuit board, the trigger diaphragm is electrically connected to the first conductive member; when the airflow is sucked from suction hole through the waterproof and breathable membrane to the outside, the trigger diaphragm is configured to partially vibrate until being in contact with the second conductive member to establish an electrical connection.

* * * * *